SIMEON HOWES, A. BABCOCK, NORMAN BABCOCK, & CARLOS EWELL
Improvement in Grain Separators.
No. 4,546 Reissued Sep. 12, 1871.
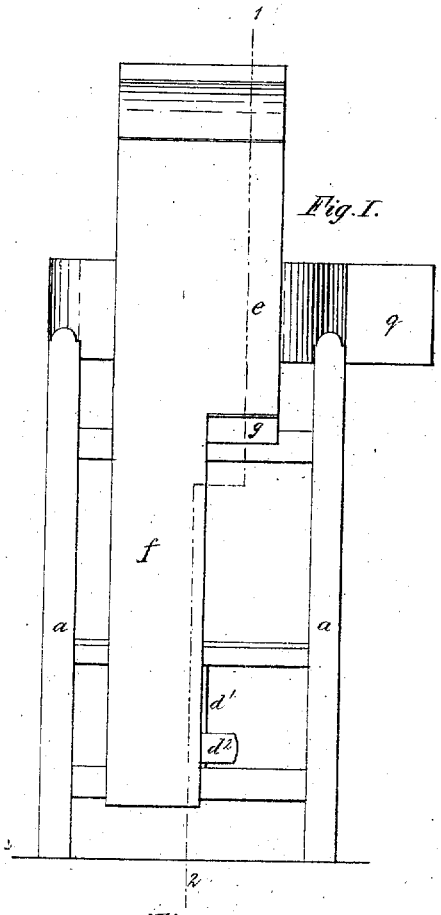
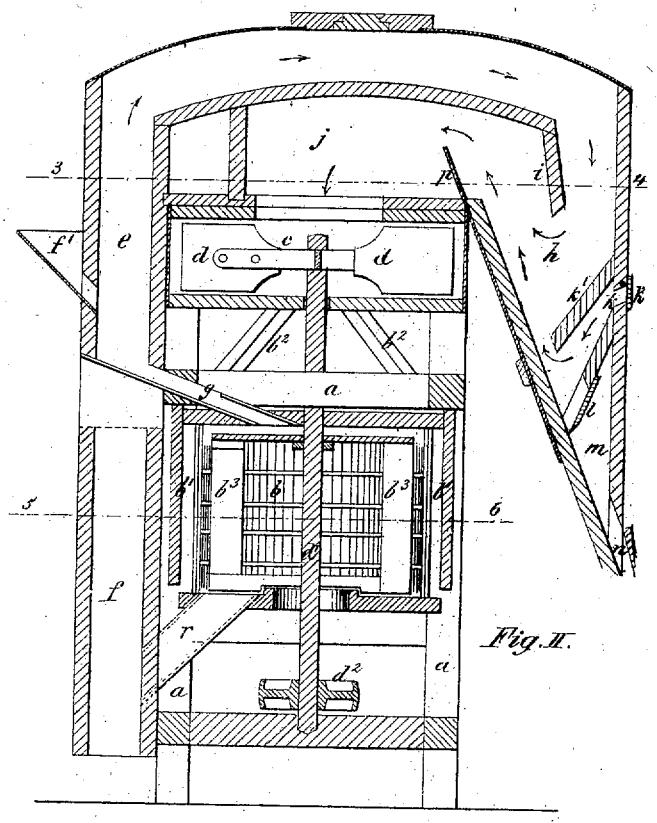
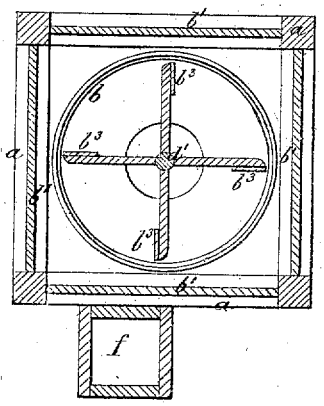
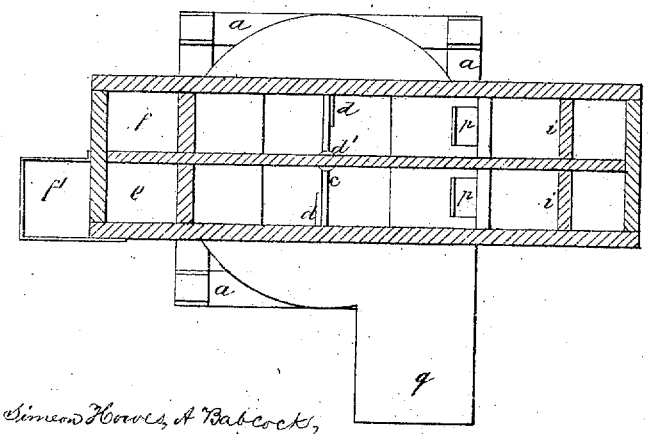
Witnesses: Wm. C. W. Stone, Saml. Smith
Simeon Howes, A. Babcock, Norman Babcock & Carlos Ewell. Ag'ts
By J. Ayd Nystrom Att'y

UNITED STATES PATENT OFFICE.

SIMEON HOWES, ALPHEUS BABCOCK, NORMAN BABCOCK, AND CARLOS EWELL, OF SILVER CREEK, NEW YORK, ASSIGNEES, BY MESNE ASSIGNMENTS, OF HENRY MONTGOMERY AND SIMEON HOWES.

IMPROVEMENT IN GRAIN-SEPARATORS.

Specification forming part of Letters Patent No. 23,039, dated February 22, 1859; reissue 2,098, dated October 31, 1865; reissue No. 4,546, dated September 12, 1871.

*To all whom it may concern:*

Be it known that SIMEON HOWES and HENRY MONTGOMERY, of Silver Creek, in the county of Chautauqua, in the State of New York, invented certain new and useful Improvements in Grain-Separators; and that the following is a full and correct description thereof, reference being had to the accompanying drawing and to the letters of reference thereon.

This invention relates to grain-separators which separate the light grains and cheat from the full grains of wheat, dust, and chaff; and its object is to effect a more complete separation of the light grains and cheat from the chaff and dust than has heretofore been accomplished.

In former grain-separators the mass of the grain was subjected to a current of air within a separating-trunk, which current of air separated the light grains, cheat, chaff, and dust from the mass, permitting the full grains to discharge from the separator, and carrying the light grains, cheat, chaff, and dust to a place of separation of the light grains and cheat from the chaff and dust, depositing the light grains and cheat at such place of separation, and carrying the dust away therefrom out of the final discharge-aperture of the separators. In some machines of this class a direction in a partially-downward curve has been given to the current as it passed through this enlargement, into which the light grains were designed to be deposited; but this downward deflection has proved insufficient for effecting a perfect separation of the light grains from the dust and chaff. But the operation of separating the light grains and cheat from the chaff, dust, and smut was imperfectly performed in said former machines—a considerable portion of the smut and dust being deposited with the light grains and cheat, owing to a defective construction and arrangement of the air-passages of the separator at the place of making this separation.

This invention consists in exposing the light grains and cheat to a counter-current of air while in the separating-trunk, and after they have been separated or thrown off from the main current of air, for the purpose of removing the accompanying chaff and dust from the separated light grains and cheat before the latter are discharged from the separating-trunk. To this end an air-opening is made through the wind-trunk below the place of reversal of the main current and above discharge-opening, the admitted current through said opening passing upward through the lighter grains and cheat before they are discharged from the separator. This invention further consists in the arrangement in the chess-receiving hopper, and with the inlet-aperture of the counter air current, of a slanting board which directs the chess and light grains and said counter-currents so as to enable the latter to act most efficiently in separating the dust and chaff from the former. This invention further consists in the combination, with the wind-trunk and chess-hopper, of a grain-separator, the former being provided with a vertical partition, *i*, (whereby the main air current is suddenly reversed from a downward direction in such manner as to throw the cheat and light grains downward out of the main current into the chess-hopper,) the slanting board, and inlet-opening for the counter-current, as hereinafter fully set forth.

But more particularly to describe this invention, reference is made to the accompanying drawing, which represents the improvements embodied in both a preliminary separator and a subsequent separator combined with a scouring mechanism.

Figure I is an end elevation of the machine. Fig. II is a vertical section in line 1 2 of Fig. I. Figs. III and IV are horizontal sections, respectively, in lines 3 4 and 5 6 of Fig. II.

*a* represents the frame of the combined machine; *b*, a perforated smutting or scouring-cylinder surrounded by an outer casing, $b^1$, the intervening chamber being connected by air-pipes $b^2$ with the exhaust-fan *c*. The fan-blades *d* and the beater-blades $b^3$ of the scouring-cylinder are carried by a vertical shaft, $d^1$, operated by a driving-pulley, $d^2$, near its lower end. There are two separating wind-trunks, *e* and *f*, arranged side by side, of like construction, except that the first or preliminary separator *e* has a shorter ascending-leg or spout.

The grain first passes into the ascending-leg of the separator *e* through a hopper, $f'$, and the full grains are discharged from the bottom of the leg through a spout, *g*, into the scouring-cylinder. The lighter grains, cheat, chaff, and dust are drawn, by the current induced by the fan through the wind-trunk, in the direction of the darts, up over the machine, and thence downward in a nearly-vertical direction to the place of separation of the light grains and cheat, immediately over and partly within the hopper-shaped part *h* of the trunk, when the direction of the current is suddenly reversed, passing around the partition *i* upward to an air-chamber, *j*, communicating with the eye of the fan. The light grains and cheat thrown down into the hopper *h* of the wind-trunk are met by a counter-current admitted through an opening, *k*, in the side of the wind-trunk, just beneath a protecting slanting-board, $k^1$, which directs the falling cheat against the counter-current, which removes therefrom the remaining chaff and dust. The chaff and dust thus removed from the separated light grains and cheat pass up with the counter-current in the direction of the darts, joining the main upward current going to the fan. The cleaned lighter grains and cheat are automatically discharged from the hopper *h* by a flap-valve, *l*, into a lower hopper, *m*, from whence they are also automatically discharged by a flap-valve, *n*. The force of the counter-current is regulated by a slide-valve, $k^2$, by which the size of the opening *k* is adjusted. The force of the main current in the separator is regulated by the slide *p*. The chaff and dust passing to the fan are blown out at the fan-spout *q*. The greater part of the dust and smut detached from the grain by the action of the beaters in the scouring-cylinder passes through the perforations of the scouring-cylinder, and is drawn from the surrounding chamber to the fan through the tubes connecting said chamber with the eye of the fan. The chaff, together with the dust and smut not separated from the scoured grain by and through the perforated scouring-cylinder, passes with the scoured grain through the spout *r* into the subsequent separator *f*.

The subsequent separator *f* is the same in construction and mode of operation as the preliminary separator *e* already described, except that the receiving or ascending-leg is made longer and extends further down toward the floor, in order to receive the scoured grain from the scourer through the spout *r*.

Neither part of this invention is limited to the precise form of wind-trunk employed.

The first part of the invention extends to cleaning separated light grains and cheat by a counter-current in the wind-trunk before discharging it, irrespective of the especial arrangement of the slant-board to protect it and guide the falling separated light grains and cheat, so long as an opening is made in the trunk by which a counter-current of air is caused to come in contact with the falling separated light grains and cheat to remove the accompanying chaff and dust.

We claim as the invention of said HOWES and MONTGOMERY—

1. In the wind-trunk of a grain-separator, in which the cheat and light grains are separated from the main air current while the chaff and dust pass off with the same, the arrangement of an air-inlet or opening below the point where such separation takes place and above the chess-discharge opening of said trunk, substantially as described, whereby a counter-current of air is caused to pass up against and through the light grains and cheat after their separation, as above stated, for the purpose of removing such dust and chaff as may have escaped removal by the main current, as hereinbefore specified.

2. In the wind-trunk of a grain-separator constructed to operate substantially as described, the arrangement of the slanting-board in relation to the side opening for the counter-current of air, substantially as shown and described, whereby the escape of the light grains through said opening is prevented, and the said light grains directed so as to be acted on in the most favorable manner by said counter-current, as hereinbefore described.

3. In combination with the main wind-trunk, vertical partition *i*, and chess-hopper of a grain-separator, the side opening *k* and slant-board $k^1$, substantially as and for the purpose hereinbefore described.

SIMEON HOWES.
ALPHEUS BABCOCK.
NORMAN BABCOCK.
CARLOS EWELL.

Witnesses:
CHAS. N. HOWES;
L. B. MONTGOMERY.

(111.)